(12) United States Patent
von Spiegel et al.

(10) Patent No.: US 12,730,307 B2
(45) Date of Patent: Sep. 8, 2026

(54) HEAD-UP DISPLAY IMAGE GENERATING UNIT WITH FOLDING MIRROR

(71) Applicant: Continental Automotive Technologies GmbH, Hannover (DE)

(72) Inventors: Wolff von Spiegel, Mühltal (DE); Daniel Krüger, Bad König (DE); Christian Junge, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 592 days.

(21) Appl. No.: 18/082,651

(22) Filed: Dec. 16, 2022

(65) Prior Publication Data

US 2023/0194862 A1 Jun. 22, 2023

(30) Foreign Application Priority Data

Dec. 16, 2021 (DE) ..................... 10 2021 214 549.3
Feb. 17, 2022 (DE) ..................... 10 2022 201 673.4

(51) Int. Cl.
*G02B 27/01* (2006.01)
*B60K 35/23* (2024.01)

(52) U.S. Cl.
CPC .......... *G02B 27/0101* (2013.01); *B60K 35/23* (2024.01); *B60K 2360/23* (2024.01); *B60K 2360/25* (2024.01)

(58) Field of Classification Search
CPC ........................... G02B 27/01; G02B 27/0101; G02B 27/0149; G02B 27/017; G02B 27/42;

(Continued)

(56) References Cited

U.S. PATENT DOCUMENTS 5,313,326 A 5/1994 Ramsbottom
5,422,756 A 6/1995 Weber (Continued)

FOREIGN PATENT DOCUMENTS

CN 1653365 8/2005
CN 107683433 2/2018

(Continued)

OTHER PUBLICATIONS

English translation of DE102006062262, (Jun. 26, 2008).*

(Continued)

*Primary Examiner* — Thomas K Pham
*Assistant Examiner* — Kuei-Jen L Edenfield
(74) *Attorney, Agent, or Firm* — COZEN O'CONNOR

(57) ABSTRACT

A head-up display for a transport comprising an image generating unit for generating an image, and an optical unit for projecting the image through a mirror unit is disclosed. The imaging unit comprises a folding mirror arranged between a light source and a display element. The light source radiates light, at a work angle to the propagation direction of the light incident on the folding mirror. The folding mirror has microstructures that have first mirror surfaces arranged at a first angle that deviates from the work angle of the folding mirror, and are spaced apart from one another to form gaps, wherein second surfaces are arranged in the gaps at a second angle. A polarizer guides light having a first polarization to the display element and light having a second polarization into the gaps. A retarder converts the polarization of the light guided into the gaps to the first polarization.

12 Claims, 6 Drawing Sheets

(58) Field of Classification Search
CPC ............ G02B 27/4205; G02B 27/4233; G02B 27/4261; G02B 5/09; G02B 19/0019; G02B 27/285; G02B 27/286; G02B 2027/0118; G02B 2027/0127; B60K 35/00; B60K 35/23; B60K 2360/23; B60K 2360/25
USPC ............. 359/485.1–485.7, 13–14, 629–633, 359/483.1–494.1; 345/7–9; 348/115; 349/11
See application file for complete search history.

(56) References Cited

U.S. PATENT DOCUMENTS

2010/0195022 A1 8/2010 Shikii et al.
2011/0116010 A1 5/2011 Nagata et al.
2013/0308185 A1* 11/2013 Robinson ................ F21V 13/12 359/465
2015/0036215 A1* 2/2015 Uchida ................ G02B 5/0278 359/489.09
2015/0362221 A1 12/2015 Yates et al.
2018/0196275 A1* 7/2018 Robinson ............... G02B 30/24
2018/0252917 A1 9/2018 Takahashi et al.
2019/0212560 A1 7/2019 Sugiyama et al.
2019/0265472 A1 8/2019 Sugiyama et al.
2020/0033600 A1 1/2020 Kweon et al.

FOREIGN PATENT DOCUMENTS

CN 109790959 5/2019
DE 4102678 A1 8/1991
DE 102006062262 B4 * 6/2008 ............. G02B 23/08
DE 102014017862 A1 6/2015
WO 2010084001 7/2010
WO 2014041689 A1 3/2014
WO 2018155958 8/2018

OTHER PUBLICATIONS

Office Action dated Aug. 10, 2022 from corresponding German patent application No. 10 2021 214 549.3.
Search Report dated May 12, 2023 from corresponding European patent application No. 22211118.9.
Extended European Search Report of corresponding European Patent Application No. 25172155.1, dated Aug. 4, 2025.
Office Action of corresponding of Chinese Patent Application No. 202211614710.4, dated Oct. 30, 2025.

* cited by examiner

HEAD-UP DISPLAY IMAGE GENERATING UNIT WITH FOLDING MIRROR

CROSS REFERENCE TO RELATED APPLICATIONS

This U.S. patent application claims the benefit of German patent application No. 10 2021 214 549.3, filed Dec. 16, 2021, and German patent application No. 10 2022 201 673.4, filed Feb. 17, 2022, both of which are hereby incorporated by reference.

TECHNICAL FIELD

The present disclosure relates to a head-up display having an image generating unit with a folding mirror.

BACKGROUND

A head-up display, also referred to as HUD, is understood to mean a display system in which the viewer can maintain their viewing direction, since the contents to be represented are superposed into their visual field. While such systems were originally used primarily in the aerospace sector due to their complexity and costs, they are now also being used in large-scale production in the automotive sector.

Head-up displays generally comprise an imaging unit or picture generating unit (PGU), an optical unit, and a mirror unit. The imaging unit generates the image and for this purpose uses at least one display element. Most head-up displays nowadays use LCD-based displays (LCD: liquid crystal display) for generating images. The optical unit directs the image onto the mirror unit. The mirror unit is a partially reflecting, light-transmissive pane. The viewer thus sees the contents represented by the imaging unit as a virtual image and at the same time sees the real world behind the pane. In the automotive sector, the windshield is often used as mirror unit, and the curved shape of the windshield must be taken into account in the representation. Due to the interaction of the optical unit and the mirror unit, the virtual image is an enlarged representation of the image produced by the imaging unit.

DE 41 02 678 A1 discloses a head-up display for a transport, having an imaging unit for generating an image, an optical unit for projecting the image through a mirror unit onto a virtual image plane, and a folding mirror whose angle of incidence and angle of reflection are not the same. This property is achieved, for example, by holographic component parts, by diffraction gratings, or by Fresnel mirrors.

U.S. Pat. No. 5,313,326 A, WO 2014/041689 A, US 2015/0362221 A1, and US 2018/252917 A1 also describe head-up displays in which a folding mirror is used whose angle of incidence and angle of reflection are not the same.

In these known head-up displays, the folding mirror, whose angle of incidence and angle of reflection are not the same, is arranged in the imaging path. Here, the folding mirror having this property can have an unfavorable influence on the image quality and/or the sensitivity to stray light.

US 2010/0195022 A1 discloses a background light fora liquid crystal display, in which an edge of a light guide is provided with a multiplicity of reflective surfaces that expand a tightly focused laser beam into a broad bundle of light. However, the use of a laser light source in head-up displays is primarily known when using micromirror units (known as DMDs, digital micromirror devices), which require a light beam having a very small cross section with a small opening angle.

US 2019/0212560 A1 discloses a head-up display, in which an optical element has a mirror with microstructures that cast light onto a display element. What is considered a disadvantage is that the illumination of the display element is non-uniform; it has dark stripes.

US 2020/0033600 A1 discloses a head-up display, in which a liquid crystal display element is to use as much of the unpolarized light generated by a light source as possible by a polarization converter.

A head-up display that is improved over the known head-up display is desirable.

SUMMARY

A head-up display according to the disclosure comprises an imaging unit for generating an image and an optical unit for projecting the image through a mirror unit. The imaging unit has a folding mirror. The folding mirror is arranged between a light source and a display element, through which the light source radiates light, at a work angle to the propagation direction of the light that is incident on the folding mirror from the light source. The work angle is for example smaller than 45°, which allows a flatter installation space. The folding mirror has microstructures. The microstructures have first mirror surfaces that are arranged at a first angle, which deviates from the work angle of the folding mirror, and are spaced apart from one another to form gaps. Second surfaces are arranged at a second angle in the gaps. A polarizer guides light having a first polarization to the display element and light having a second polarization into the gaps. A retarder converts the polarization of the light guided into the gaps to the first polarization. The light guided into the gaps is guided in the direction of the display element after it has passed through the gaps. The polarization recycling is realized and that light from the gaps also reaches the display element. In the normal case, only one of the polarization directions generated by the light source is used if the display element is a display element that modulates linearly polarized light. This is the case for example in liquid crystal displays (LCDs). According to the disclosure, the polarization that is usually not used is converted by a polarizer and retarder using the gaps between the folding mirror into the polarization required by the display element and is fed to the latter. The light that is guided into the gaps and passes through them has the same polarization as the light polarized by the mirror surfaces. The display element is thus illuminated seamlessly with light having a single polarization. Moreover, in the ideal scenario, additional homogenization measures are not required. Such an ideal scenario arises for example for specific duty cycles. In a real system, the stripe structure is also diffused for example with diffusers. Such diffusion then serves to light the eyebox.

According to one embodiment, the first mirror surfaces have first angles that differ from one another. Groups of first mirror surfaces having identical first angles may also have first angles that differ from one group to the next. However, for example, each first mirror surface has a different first angle from the respective other first mirror surfaces. This has the effect as if the folding mirror were a curved folding mirror, also known as a cylindrical mirror. Viewed macroscopically, the folding mirror is not curved, but rather the first mirror surfaces and the second surfaces of the microstructures are arranged such that the folding mirror acts like a cylindrical mirror. In this way, a fanned-out emission or an astigmatism is realized, which is desirable if defined conditions of a head-up display are present.

The first mirror surfaces are embodied in the form of reflective polarizers and the gaps in the form of retarders rotating the polarization direction by 90°. Such a retarder is also referred to as a λ/2 plate or half-wave plate. This variant according to the disclosure combines the functions of reflection of light at the mirror surfaces and filling the gaps between the mirror surfaces with light in a single component part, which may be separately prefabricated and tested. This additionally facilitates the installation.

According to the disclosure, the folding mirror has two mutually parallel interfaces, which both have the same microstructures arranged with a mutual offset. This configuration is advantageous for example if gaps and mirror surfaces have the same extent in projection onto the propagation direction of the light. The offset then logically has the same size as this extent or an integer multiple thereof. The production of the folding mirror is possible in one operation, and there is then no need to adjust the macrostructures in relation to one another.

According to one embodiment, the folding mirror has two mutually parallel interfaces, of which the upper interface has first mirror surfaces and the lower interface has first mirror surfaces. The first mirror surfaces of the lower interface have second angles that differ from one another. For example, this can be used to ensure that a plurality of groups of first mirror surfaces are present in which the mirror surfaces of one group each have the same second angle, but with the second angles differing from group to group. In one embodiment, each of the first mirror surfaces of the lower interface has a different second angle than the respectively other first mirror surfaces. A fanned-out emission or an astigmatism is also realized by the first mirror surfaces of the lower interface. Each of the first mirror surfaces of the lower interface has an angle, which is referred to as the second angle, whose value lies between the values of the angles of two adjacent first mirror surfaces of the upper interface. The angle of the first mirror surfaces of the upper interface is referred to as the first angle. The production of the folding mirror is possible in one operation, and there is then no need to adjust the macrostructures in relation to one another.

According to one embodiment, the polarizer is designed as a reflective polarizer and is arranged between the folding mirror and the display element. In accordance with this embodiment, the retarder is a retarder that converts linear polarization into circular polarization and through which the light passes twice. Such a retarder is also referred to as a λ/4 plate or quarter-wave plate. In other words, the effect of a lambda/2 retarder is split here and the retardation is distributed over two passes. The retarder of this embodiment is arranged between the folding mirror and the polarizer. The component parts are designable to be two-dimensional, as a result of which cost-effective component parts from mass production are usable.

The polarizer used is the input-side polarizer of a display element that requires polarized input light, for example a liquid crystal display element. This saves on component parts and is also associated with lower light output losses and fewer disturbances due to the smaller number of interfaces through which the light has to pass.

The polarizer and retarder are also designed in one piece as a reflective circular polarizer according to this embodiment.

The reflective polarizer is inclined at an angle deviating from 90° to the propagation direction of the light coming from the folding mirror, which is incident thereon, and the reflecting second surfaces are arranged parallel to the reflective polarizer. Light which is reflected by the reflective polarizer and is not or hardly divergent is not reflected back onto the first mirror surfaces but, with an appropriate choice of angles and distances, onto one of the second reflecting surfaces in the gaps. It is reflected hereby parallel to the light reflected by the first mirror surfaces in the direction of the polarizer, from where it is transmitted after adaptation of the polarization direction by the retarder. In this way, a very large proportion of the light of both polarizations is utilized, and almost no dark regions are brought about by the gaps. The display element is illuminated very homogeneously.

According to one embodiment, the folding mirror is part of a transparent body with a wedge-shaped cross section, in which the wedge base area is the light entrance surface facing the light source, the microstructures are arranged on one of the large side faces of the wedge, and the other large side face of the wedge is the light exit surface facing the display element. The transparent body is a large-volume component part that is less fragile than very thin component parts, which simplifies handling during production. The transparent body is molded for example in a large mold and subsequently provided on the light exit surface with a polarizer functionality and a retarder functionality, for example with corresponding coating. These are proven production methods providing reliable results.

Reflecting second surfaces are provided, which form a retroreflector in pairs in each case. Such an arrangement is robust against angle tilt. Even in the case of folding mirrors which are not aligned exactly with the incident light, said folding mirror reflects such that the reflected light travels parallel to the incident light.

The first mirror surfaces have angles that differ from one another. This can be done in groups, as mentioned above. According to one embodiment, each of the first mirror surfaces has a different first angle, and the reflective polarizer has first polarizer surfaces and second polarizer surfaces which form a retroreflector in pairs in each case. Consequently, the light fanned-out by the first mirror surfaces is reflected in the case of the reflection at the reflective polarizer by 180°, independently of the angle at which it is incident on the reflective polarizer. The reflection at the second surfaces also takes place by 180° if these are likewise designed as retroreflectors. The angle fanning caused by the first mirror surfaces is consequently also maintained after said double reflection, and the light that has been rotated in terms of its polarization then passes through the reflective polarizer at the same angle as the light that was already polarized such that it could pass through it when it was first incident on the reflective polarizer. In this way, a fanned-out emission or an astigmatism is also realized, which is desirable if defined conditions of a head-up display are present.

Likewise, the folding mirror and the display element are aligned parallel to each other. Light beams from the folding mirror that are incident on the display element therefore have traveled the same path distance. Uniform illumination of the display element is thus obtained, since deviations caused by differences in path distances do not occur in this constellation.

This also occurs if generally in a head-up display a folding mirror with the property that the angle of incidence and the angle of reflection are, viewed macroscopically, not the same is aligned parallel to a display element of said head-up display.

Further features of the present disclosure will emerge from the following description and the appended claims in conjunction with the figures.

DETAILED DESCRIPTION

For a better understanding of the principles of the present disclosure, embodiments of the disclosure will be explained in more detail below with reference to the figures. The same reference signs are used in the figures for identical or functionally identical elements and are not necessarily described again for each figure. It goes without saying that the disclosure is not limited to the illustrated embodiments and that the described features may also be combined or modified without departing from the scope of protection of the disclosure as defined in the appended claims.

Figure 1:
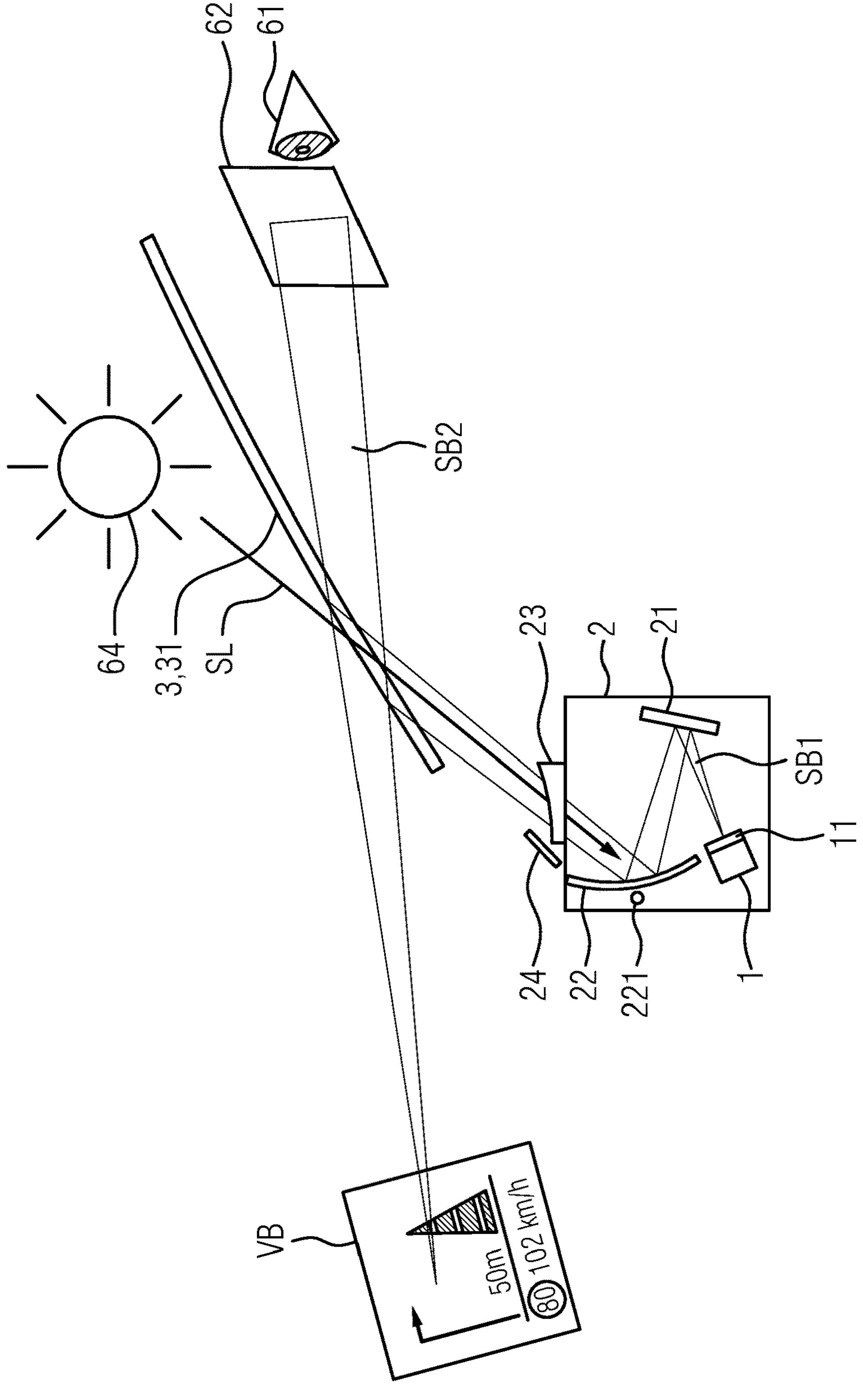
FIG. 1 schematically shows a head-up display according to the prior art for a motor vehicle.

FIG. 1 shows a schematic diagram of a head-up display for a motor vehicle according to the prior art. The head-up display has an imaging unit 1, an optical unit 2, and a mirror unit 3. A beam of rays SB1 emanates from a display element 11 and is reflected by a first mirror 21 onto a curved mirror 22, which reflects it in the direction of the mirror unit 3. The mirror unit 3 is represented here as a windshield 31 of a motor vehicle. From there, the beam of rays SB2 travels in the direction of an eye 61 of a viewer.

The viewer sees a virtual image VB that is located outside the motor vehicle, above the engine hood or even in front of the motor vehicle. Due to the interaction of the optical unit 2 and the mirror unit 3, the virtual image VB is an enlarged representation of the image displayed by the display element 11. A speed limit, the current vehicle speed, and navigation instructions are symbolically represented here. As long as the eye 61 is within the eyebox 62, which is indicated by a rectangle, all elements of the virtual image are visible to the eye 61. If the eye 61 is outside the eyebox 62, the virtual image VB is only partially or not at all visible to the viewer. The larger the eyebox 62 is, the less restricted the viewer is when choosing their seating position.

The curvature of the curved mirror 22 is adapted to the curvature of the windshield 31 and ensures that the image distortion is stable over the entire eyebox 62. The curved mirror 22 is rotatably mounted by a bearing 221. The rotation of the curved mirror 22 that this allows thereby makes it possible to displace the eyebox 62 and thus to adapt the position of the eyebox 62 to the position of the eye 61. The first mirror 21 serves to ensure that the path traveled by the beam of rays SB1 between the display element 11 and the curved mirror 22 is long and, at the same time, that the optical unit 2 is nevertheless compact. The optical unit 2 is separated from the environment by a transparent cover 23. The optical elements of the optical unit 2 are thus protected, for example, against dust located in the interior of the vehicle. An anti-glare protection 24 serves to reliably absorb the light reflected via the interface of the cover 23 so that the observer is not dazzled. In addition to the sunlight SL, the light from another stray light source 64 can also reach the display element 11.

Figure 2:
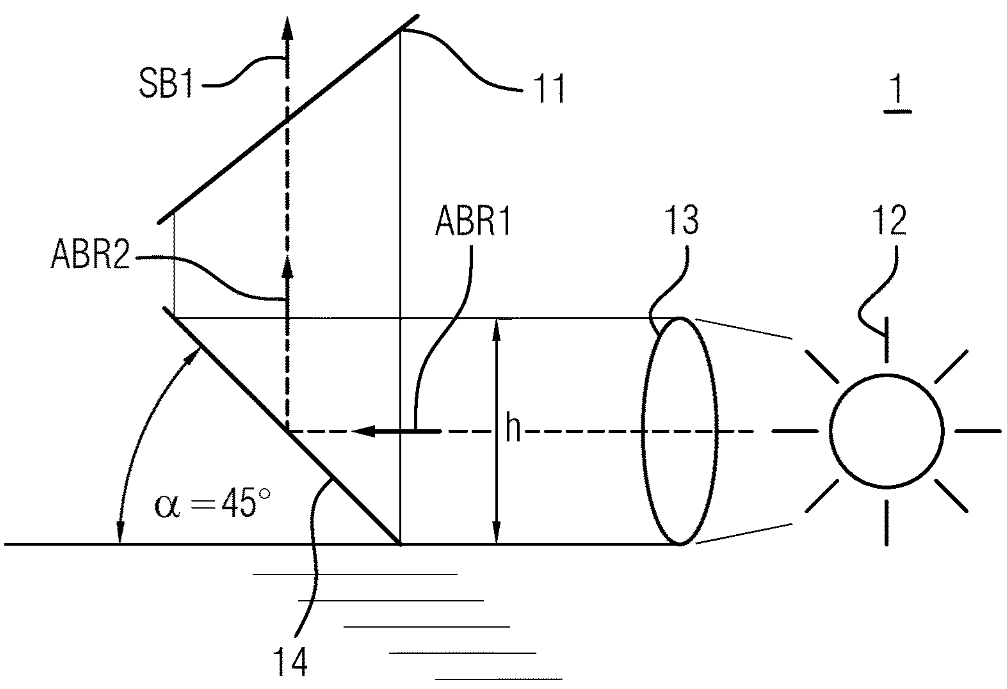
FIG. 2 schematically shows the imaging unit of a head-up display.

FIG. 2 schematically shows the imaging unit 1 of a head-up display. It shows the light source 12, whose light is collimated by a collimator 13. The collimated bundle of light has in the image plane a height h perpendicular to its propagation direction ABR1. The bundle of light is reflected by a mirror 14 arranged at an angle of $\alpha=45°$ to the propagation direction ABR1 and radiates through the display element 11 in its propagation direction ABR2 aligned at an angle of 90° to the propagation direction ABR1 and enters from there the optical unit 2 (not illustrated here) in the form of the beam of rays SB1. The display element 11 is not arranged at a right angle to the propagation direction ABR2, but at an angle deviating from 90°, which is shown here as deviating very markedly from 90°.

Figure 3:
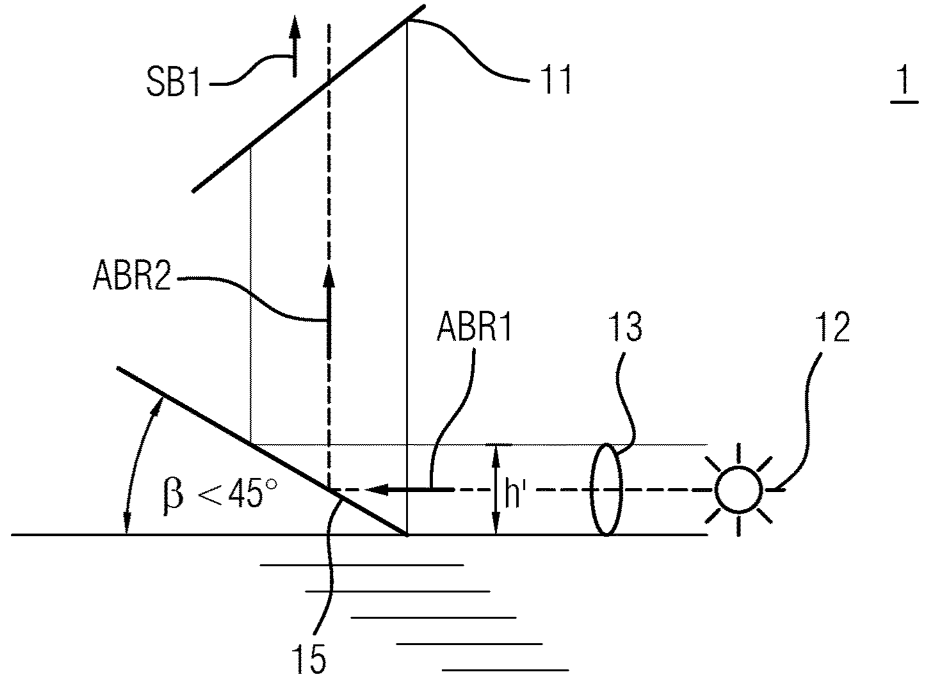
FIG. 3 schematically shows the imaging unit of a head-up display according to the disclosure.

FIG. 3 schematically shows the imaging unit of a head-up display according to the disclosure. It illustrates the folding mirror 15 according to the invention, which is arranged at an angle of $\beta<45°$. Due to the property of said folding mirror that angles of incidence and angles of reflection are not the same, there is no change with respect to the principle propagation direction ABR1 of the light arriving on said folding mirror from the light source 12 and of the light reflected by said folding mirror in the propagation direction ABR2 in the direction of the display element 11, in comparison with the previous figure. However, the extents of the light source 12 and of the collimator 13 and also the height h' of the collimated bundle of light are incident smaller than in the previous figure. A saving in terms of installation space is consequently realized. The height h' in this figure is smaller than the height h in the previous figure. Not only does this mean that the space required by the arrangement is smaller, but also that the illumination unit, here the light source 12, only needs to produce a flatter bundle of light, as a result of which the light source 12 is also more compact. Another advantage in terms of installation space that is likewise important is based on the ability to position the light source more freely while at the same time maintaining the desired angle in the region of the display. The smaller light source additionally saves space in the realization form, for example as light-emitting diodes.

In FIG. 3, the distance between the display element 11 and the folding mirror 15 is shown to be larger than it actually is for the sake of clarity. The saving in terms of installation space obtained in accordance with the disclosure is noticeable in the figure mainly by the height h', which is lower than the height h of the FIG. 2. The area over which the display element 11 is lit also appears to be smaller than in FIG. 2, which likewise is not the case, but is due to the schematic illustration.

Figure 4:
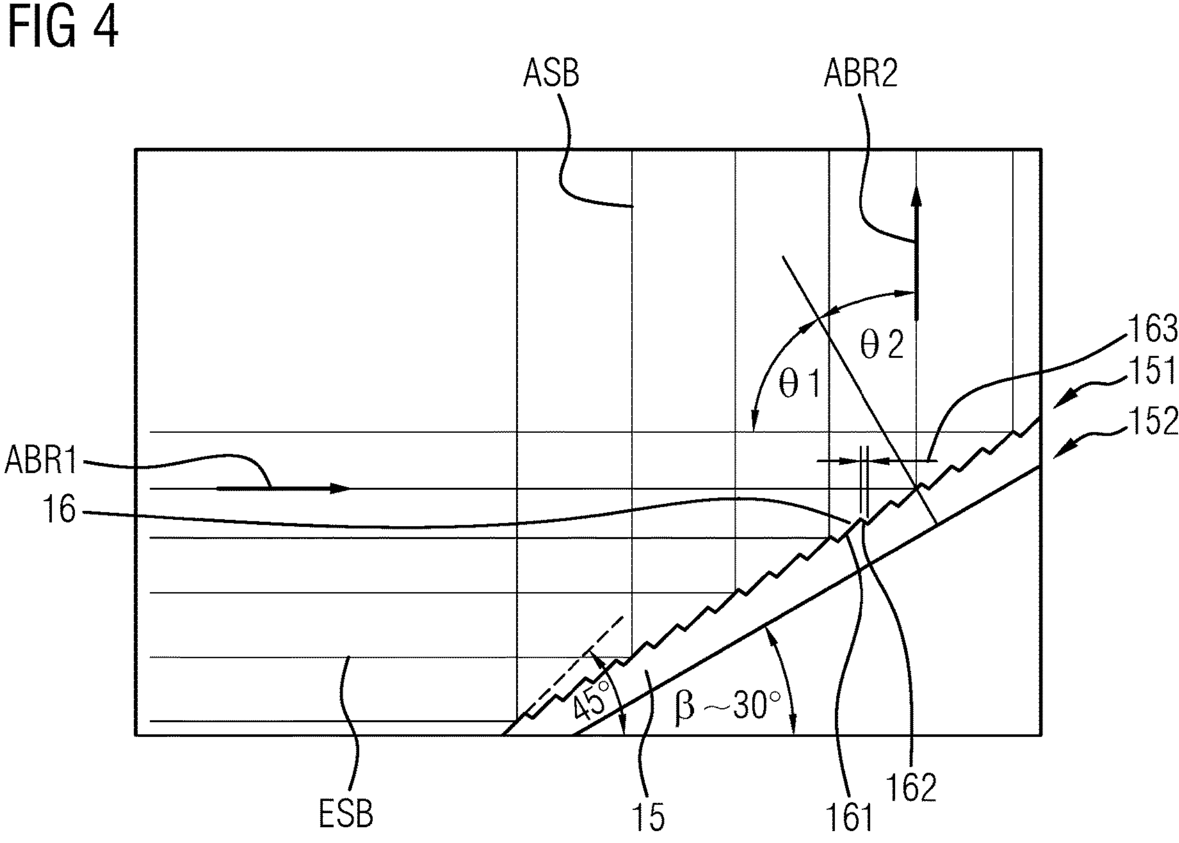
FIG. 4 schematically shows a folding mirror of a head-up display.

FIG. 4 schematically shows a folding mirror 15 of a head-up display. The folding mirror 15 has a first interface 151, at which incident light is reflected, and a second interface 152. It may be seen that the folding mirror 15 has on its first interface 151, the reflective surface, many microstructures 16 that each taken by itself fulfill the known rule that the angle of incidence is the same as the angle of reflection. In macroscopic terms, averaged over the microstructures 16, the first interface 151 and the second interface 152 are parallel to each other. The microstructures 16 have first mirror surfaces 161, which in the exemplary embodiment shown have an angle of 45° to the propagation direction ABR1 and to the propagation direction ABR2. In the propagation direction ABR1, gaps 163 are located between in each case two mirror surfaces 161. The mirror surfaces 161 are connected to one another in the gaps 163 by inclined second surfaces 162.

In macroscopic terms, the angle of incidence θ1 of the folding mirror 15 is greater than its angle of reflection θ2, which are drawn in each case to the perpendicular of the interfaces 151, 152. In the exemplary embodiment shown, θ1=90°−β and θ2=β. It shows an incidence bundle of rays ESB in the propagation direction ABR1, which, after reflection at the folding mirror 15, leaves the folding mirror 15 as a reflection bundle of rays ASB in the propagation direction ABR2.

Pre-collimated light sources that may consist of a plurality of individual light sources arranged one next to the other, also known as arrays, either radiate directly onto diffusers behind the display element, also referred to as display below, or are previously deflected by folding mirrors. In these, macroscopically, angle of incidence=angle of reflection. This leads to conflicts in term of installation space. In the corners/edges between array cells, particularly intensive color and brightness deviations may occur. Frequently, light-emitting diodes (LEDs) are used as light sources. The polarization direction of the LED light that does not match with the display polarizer is kept away from the display and is lost. This requires additional components or takes place in the display and heats it up. Tilting the folding mirror by an angle changes the angle of the illuminating light by twice the angle.

Such solutions increase installation space requirement which restricts the image size, of the requirement of arrays with relatively high numbers of cells, color and brightness homogeneities, and losses in efficiency due to the loss of a polarization component. Improved concepts for image generating units that need to be reconciled with the given installation space requirements are desirable and shown according to the disclosure.

The core idea of the disclosure is a finely stepped folding mirror 15, which deviates macroscopically from the angle of incidence=angle of reflection of a conventional mirror 14, see FIG. 4, and enables polarization recycling with developments described in the text below. The properties and freedoms thus attained open up an entire bunch of design possibilities with advantages going beyond savings in terms of installation space.

For one, it offers particularly space-saving possibilities for folding the beam path of the image generating unit 1 into the installation space. The light distribution is spread out by being divided into stripes that are pulled apart. In this way, the original illumination unit may be made smaller. This helps to avoid array boundaries in the image region and to improve the homogeneity. Embodiment variants according to the disclosure allow tolerance-insensitive designs and increases in efficiency due to polarization recycling.

Figure 5:
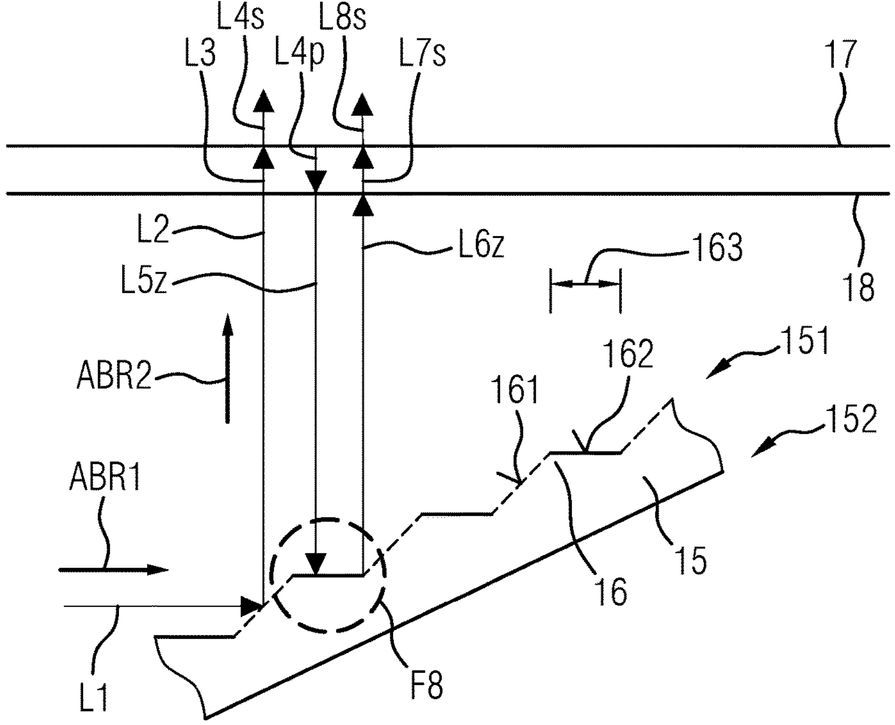
FIG. 5 schematically shows a part of a first embodiment.

FIG. 5 schematically shows a part of a first embodiment according to the disclosure. It shows the folding mirror 15, whose upper interface 151 has microstructures 16 and whose lower interface 152 does not have any particular optical or geometric properties that are essential in connection with the disclosure. The microstructures 16 have first mirror surfaces 161, which have an angle of 45° to the propagation direction ABR1 of the incident light. Between the first mirror surfaces 161 are gaps 163, in which second surfaces 162 are arranged that are likewise designed in the form of reflecting surfaces. The second surfaces 162 are aligned parallel to the propagation direction ABR1 of the incident light. A retarder 18 and a polarizer 17 are arranged above the folding mirror 15. In the present embodiment, the retarder 18 has the property of a quarter-wave plate, which is to say it converts linearly polarized input light into circularly polarized output light, and vice versa. The polarizer 17 is a reflective polarizer that allows linearly polarized light of a first polarization direction through and reflects light that is polarized perpendicularly thereto.

Unpolarized light L1 that is produced by the light source 12 and is collimated by the collimator 13 falls from the left onto the folding mirror 15 in the propagation direction ABR1. For the sake of clarity, only one light ray is drawn by way of example. This unpolarized light L1 is reflected by the mirror surfaces 161. It travels to the retarder 18 in the form of unpolarized light L2 in the propagation direction ABR2, passes through it, and leaves it in the form of unpolarized light L3. It is incident on the reflective polarizer 17, which lets pass (transmits) s-polarized light L4*s* and returns (reflects) p-polarized light L4*p*. For the sake of clarity, this is schematically illustrated in the figure offset to the right. The p-polarized light L4*p* passes through the retarder 18 and leaves it in the form of circularly polarized light L5*z*. The latter is incident on the reflecting second surfaces 162 and is reflected thereby in the form of circularly polarized light L6*z* back to the retarder 18. It passes through the latter and leaves it in the form of s-polarized light L7*s*. The latter passes through the reflective polarizer 17 because it now has the polarization direction that the polarizer does not reflect but transmit. Consequently, further s-polarized light L8*s* travels in the direction of the display element 11.

In FIG. 5, the respectively described light L×n (x=1,2, . . . n=p/z/s/_) is drawn parallel to the respective propagation direction ABR1, ABR2, and is shown with a lateral offset after reflection at the polarizer 17 or at a reflecting second surface 162. The latter indicates that the light in the normal case does not consist of ideally parallel rays but of at least slightly divergent rays. These are to a large extent reflected obliquely by the polarizer 17 and so arrive at one of the reflecting second surfaces 162 and are reflected there again. Additionally or alternatively, the first mirror surfaces 161 can have a curvature that makes the light L2 reflected thereby already more divergent than the light L1 that is incident thereon. Further possibilities may be making the polarizer wavy or tilting it. If it is inclined, the inclination of the mirror surfaces 162 is matched so as to minimize the angular deviation. With one or more of these measures, a part of the light L4*s* transmitted by the polarizer 17 already fills a part of the dark regions, caused due to the gaps 163, in the light traveling to the display element 11. In addition, light L8*s* also passes into said dark regions. More of the originally incident light L1 passes to the display element 11 and has a more uniform brightness profile. The display element 11 is located at a distance above the polarizer 17 and is not shown here. The marked region F8 may be designed in accordance with a variant described further below.

Figure 6:
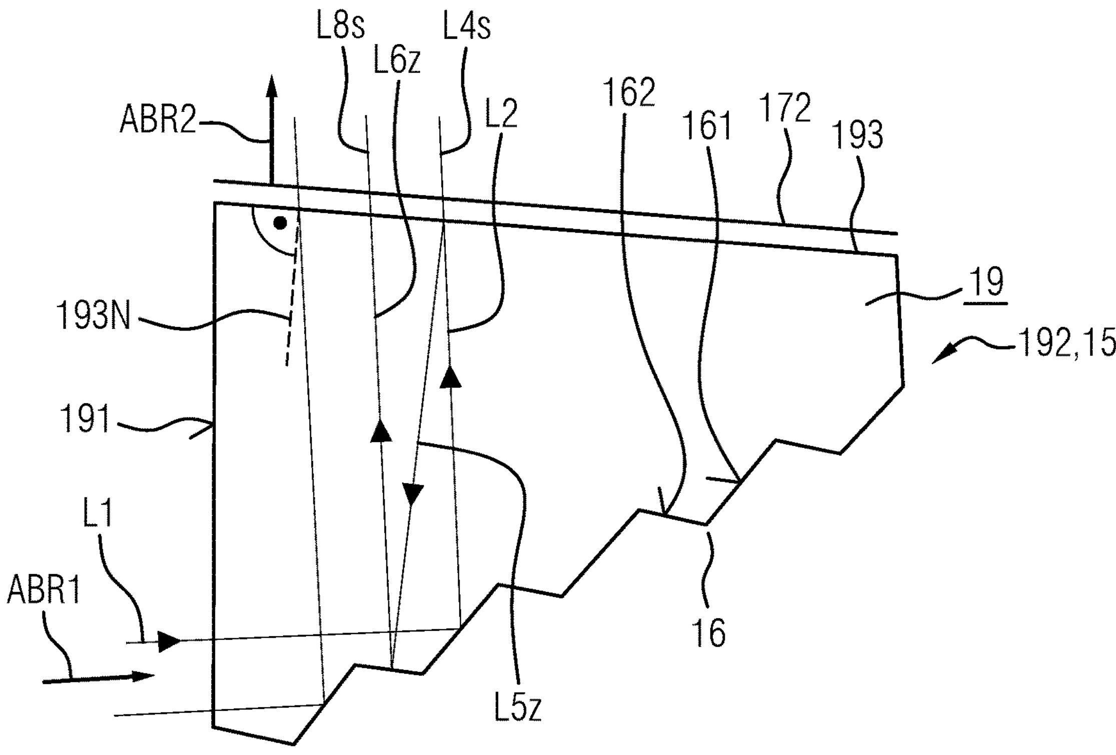
FIG. 6 schematically shows a part of a second embodiment.

FIG. 6 schematically shows a part of a second embodiment. Here, the folding mirror 15 is a part of a transparent body 19. The transparent body 19 has a wedge-shaped cross section, which is shown here in cross section. The tip of the wedge, which is on the right in the figure, is capped and therefore not shown. The wedge base area 191 is the light entrance surface facing the light source. The microstructures 16 are arranged on one of the large side faces 192 of the wedge. The other large side face 193 of the wedge forms the light exit surface facing the display element 11.

In an embodiment that is not shown here, the microstructures 16, the polarizer 17, and the retarder 18 are arranged as shown in the previous figure. In the embodiment shown here, the first mirror surfaces 161 are, as described above, arranged at an angle of 45° to the propagation directions ABR1, ABR2. The reflecting second surfaces 162, however, are not arranged parallel to the propagation direction ABR1, but are tilted at an acute angle with respect to it. They are tilted such that they are not in the way of light L1 incident from the left on its way to one of the first mirror surfaces 161, but are tilted away, viewed in its propagation direction, from a first mirror surface 161 to the next. The other large side face 193 of the wedge-shaped transparent body 19 has the same inclination as the reflecting second surfaces 162. This may be seen by the acute angle between the normal 193N of the side face 193 and the propagation direction ABR2. The polarizer which is embodied here as a reflective circular polarizer 172 and which also combines the function of the retarder 18 in itself is arranged on the side face 193 and consequently has the same inclination. The first large side face 192 is provided with a mirror coating.

Unpolarized light L1 that is produced by the light source 12 and is collimated by the collimator 13 falls from the left onto the folding mirror 15 in the propagation direction ABR1. For the sake of clarity, only a few light rays are drawn here by way of example. This unpolarized light L1 is reflected by the mirror surfaces 161. It travels in the propagation direction ABR2 in the form of unpolarized light L2 to the reflective circular polarizer 172. The latter transmits s-polarized light L4*s* and reflects circularly polarized light L5*z*. Owing to the slight tilting of the perpendicular on the side face 193 to the propagation direction ABR2, this circularly polarized light L5*z* propagates at an angle to the propagation direction ABR2 that deviates from 0°. The latter is incident on the reflecting second surfaces 162 and is reflected thereby in the form of circularly polarized light L6*z* back to the retarder 18. Due to the inclined arrangement of the reflecting second surfaces 162, it once again propagates parallel to the propagation direction ABR2. It is incident on the reflective circular polarizer 172 and is transmitted thereby. Consequently, further s-polarized light L8*s* travels in the direction of the display element 11.

FIG. 6 is therefore also an example of the variant of the disclosure in which the reflective polarizer 172 is inclined at an angle deviating from 90° to the propagation direction ABR2 of the light L2 incident thereon, which is coming from the folding mirror 15, and the reflecting second surfaces 162 are arranged parallel to the reflective polarizer 172.

Figure 7:
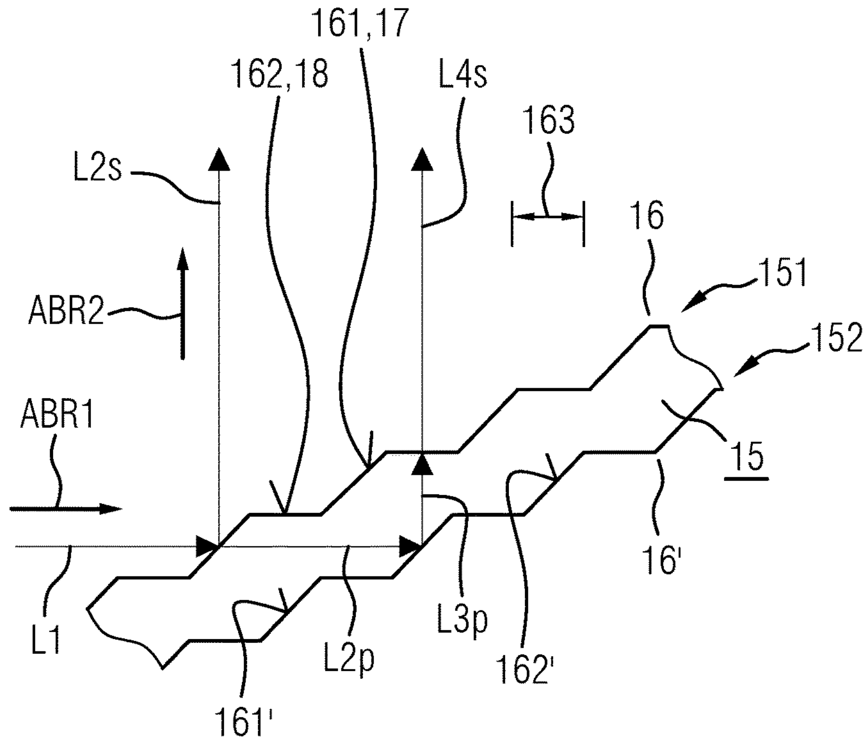
FIG. 7 schematically shows a part of a third embodiment.

FIG. 7 schematically shows a part of a third embodiment. Here, the folding mirror 15 has a first interface 151 and a second interface 152, which are both arranged parallel to each other and have microstructures 16, 16' arranged with an offset to one another. In the exemplary embodiment shown, the offset is selected such that, in the propagation direction ABR1 of the light L1 coming from the light source 12, first mirror surfaces 161 of the first interface 151 and first mirror surfaces 161' of the second interface 152 follow one another. In the propagation direction ABR2 perpendicular thereto, in each case first mirror surfaces 161 of the first interface 151 and second surfaces 162' of the second interface 152 follow one another, and also second surfaces 162 of the first interface 151 and first mirror surfaces 161' of the second interface 152 follow one another. The mirror surfaces 161 of the first interface 151 are embodied in the form of a reflecting polarizer 17. The second surfaces 162 of the first interface 151 are embodied in the form of retarders 18 rotating the polarization direction by 90°. The first mirror surfaces 161' of the second interface 152 are embodied in the form of mirrors that do not influence the polarization. The first mirror surfaces 161, 161' are arranged at an angle of 45° both to the propagation direction ABR1 of the light L1 coming from the light source 12 and also to the propagation direction ABR2 of the light traveling to the display element 11. The second surfaces 162,162' are aligned parallel to the propagation direction ABR1 of the light L1 coming from the light source 12.

Unpolarized light L1 that is produced by the light source 12 and is collimated by the collimator 13 falls from the left onto the folding mirror 15 in the propagation direction ABR1. For the sake of clarity, only one light ray is drawn by way of example. This unpolarized light L1 is reflected as s-polarized light L2*s* by the mirror surfaces 161 and transmitted as p-polarized light L2*p*. The s-polarized light L2*s* travels in the propagation direction ABR2 in the direction of the display element 11. The p-polarized light L2*p* is reflected by the first mirror surfaces 161' of the second interface 152 and travels in the form of p-polarized light L3*p* from the inside to the second surfaces 162 of the first interface 151. Since these are embodied as retarders 18 rotating the polarization by 90°, they transmit the light that is incident thereon, which leaves them in the form of s-polarized light L4*s* in the propagation direction ABR2 in the region of the gaps 163. Consequently, further s-polarized light L4*s* travels in the direction of the display element 11.

Figure 8:
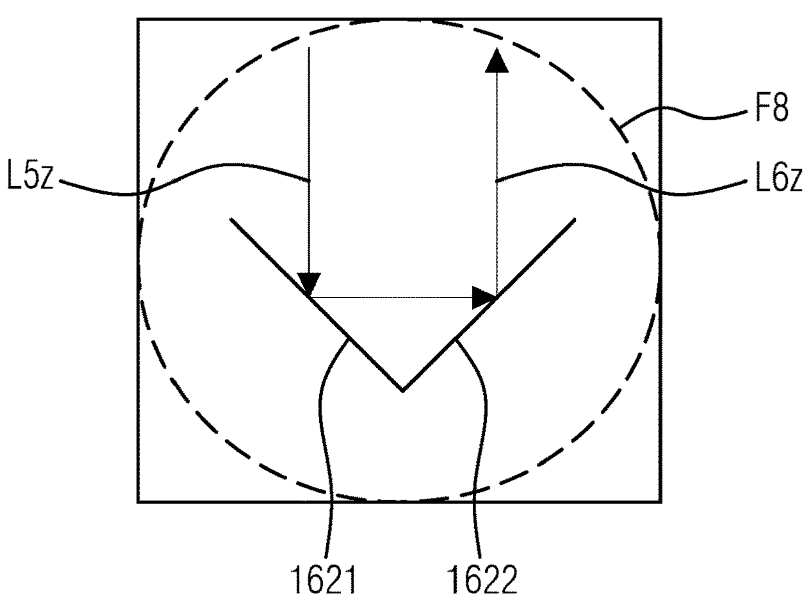
FIG. 8 shows a variant of the first embodiment.

FIG. 8 shows an embodiment of the region F8, which was marked in FIG. 5. Instead of a single surface, two reflecting second surfaces 1621, 1622 are provided here, which are arranged at a right angle to each other. They therefore act as a retroreflector. Incident light L5*z* is here reflected in any event such that the reflected light L6*z* is aligned parallel thereto. While in the variant shown in FIG. 5 light that is incident and light that is reflected is parallel to one another only if the incident light is incident on the reflecting surface 162 at precisely a right angle, this is the case in a retroreflector even in the event of an angular deviation.

Figure 9:
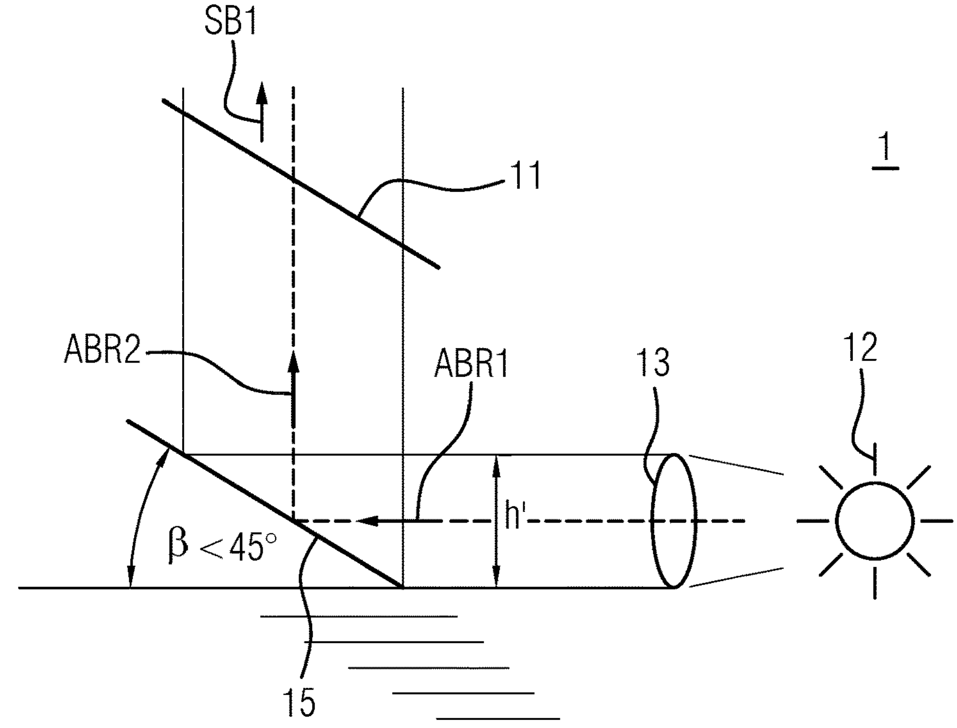
FIG. 9 shows a further embodiment.

FIG. 9 shows an imaging unit 1 described similar to the case of FIG. 3. However, the display element 11 is here arranged at the same angle β as the folding mirror 15. The folding mirror 15 and display element 11 are consequently aligned parallel to each other. Light beams from the folding mirror 15 that are incident on the display element 11 therefore have traveled the same path distance. Uniform illumination of the display element 11 is thus obtained, since deviations caused by differences in path distances do not occur in this constellation. This is in particular advantageous when using a two-dimensional display element 11, which consists for example of a single two-dimensional light-emitting element or of an LED array in which a plurality of LEDs are arranged distributed over a surface. This advantage also occurs if generally in a head-up display a folding mirror with the property that the angle of incidence and the angle of reflection are, viewed macroscopically, not the same is aligned parallel to a display element of said head-up display.

Figure 10:
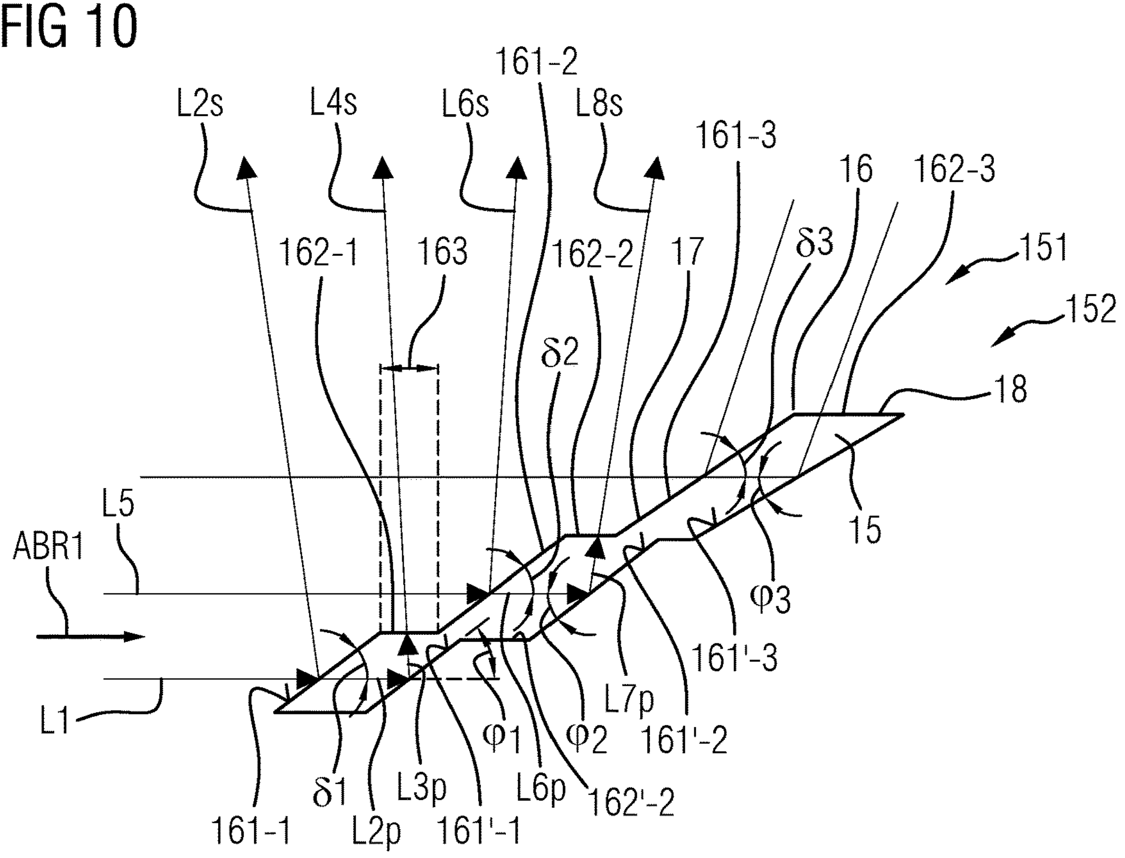
FIG. 10 shows a first embodiment with a curved folding mirror.

FIG. 10 schematically shows a part of a first embodiment with a curved folding mirror 15. Viewed macroscopically, the folding mirror 15 is not curved, but rather the microstructures 16 are arranged such that the folding mirror 15 acts like a cylindrical mirror. The folding mirror 15 has two mutually parallel interfaces 151, 152. The upper interface 151 is the interface that is first reached by the incident light L1. The upper interface 151 has first mirror surfaces 161-*i* with i=1, 2, 3, . . . , of which the mirror surfaces 161-1, 161-2 and 161-3 are shown in the exemplary embodiment illustrated here. The upper interface 151 has second mirror surfaces 162-*i* with i=1, 2, 3, . . . , of which the second surfaces 162-1, 162-2 and 162-3 are shown in the exemplary embodiment illustrated here. These are located in gaps 163 between the mirror surfaces 161-*i*. The lower interface 152 is the interface on which light L2*p* is incident, which is transmitted through the upper interface 151. The lower interface 152 has mirror surfaces 161'-1, 161'-2 and 161'-3.

The first mirror surface 161-1 of the first mirror surfaces 161-*i* shown has a first angle $\delta 1$ to the propagation direction ABR1, the first mirror surface 161-2 has a first angle $\delta 2$ to the propagation direction ABR1, and the first mirror surface 161-3 has a first angle $\delta 3$ to the propagation direction ABR1. The first angles $\delta 1$, $\delta 2$ and $\delta 3$ slightly differ from one another here. Consequently, each of the first mirror surfaces 161-*i* has a different first angle $\delta i$. The first mirror surface 161'-1 of the lower interface 152 has a second angle $\varphi 1$ to the propagation direction ABR1. The first mirror surface 161'-2 has a second angle $\varphi 2$ to the propagation direction ABR1. The first mirror surface 161'-3 has a second angle $\varphi 3$ to the propagation direction ABR1. Consequently, each of the first mirror surfaces 161'-*i* of the lower interface 152 has a different second angle $\varphi i$ than the respectively other first mirror surfaces 161'-*i*. The first angles $\delta i$ and the second angles $\varphi i$ decrease from the left to the right in the exemplary embodiment shown. The following holds true:

$\delta 1<\varphi 1<\delta 2<\varphi 2<\delta 3<\varphi 3$. Consequently, the value of each second angle $\varphi i$ lies between the values of the first angles $\delta i$ of two adjacent first mirror surfaces 161-*i*. The light beams L× upwardly leaving the folding mirror 15 are thus uniformly fanned out. The second surfaces 162-*i*, 162-*i'* are aligned parallel to the propagation direction ABR1 of the light L1 coming from the light source 12.

The mirror surfaces 161-*i* of the upper interface 151 are embodied in the form of a reflecting polarizer 17. The second surfaces 162-*i* of the first interface 151 are embodied in the form of retarders 18 rotating the polarization direction by 90°. The first mirror surfaces 161'-*i* of the lower interface 152 are embodied in the form of mirrors that do not influence the polarization.

Unpolarized light L1 that is produced by the light source 12 and is collimated by the collimator 13 falls from the left onto the folding mirror 15 in the propagation direction ABR1. For the sake of clarity, only a few light rays are drawn here by way of example. This unpolarized light L1, L5 is reflected as s-polarized light L2*s*, L6*s* by the mirror surfaces 161-*i* and transmitted as p-polarized light L2*p*, L6*p*. The s-polarized light L2*s*, L6*s* travels upwardly in the direction of the display element 11. The p-polarized light L2*p*, L6*p* is reflected by the first mirror surfaces 161'-1, 161'-2 of the second interface 152 and travels in the form of p-polarized light L3*p*, L7*p* from the inside to the second surfaces 162-*i* of the first interface 151. Since these are embodied as retarders 18 rotating the polarization by 90°, they transmit the light that is incident thereon, which leaves them in the form of s-polarized light L4*s*, L8*s* upwardly in the figure in the region of the gaps 163. Consequently, further s-polarized light L4*s*, L8*s* travels in the direction of the display element 11. It is evident that the light L× traveling in the direction of the display element 11 consists of fanned-out light beams.

Figure 11:
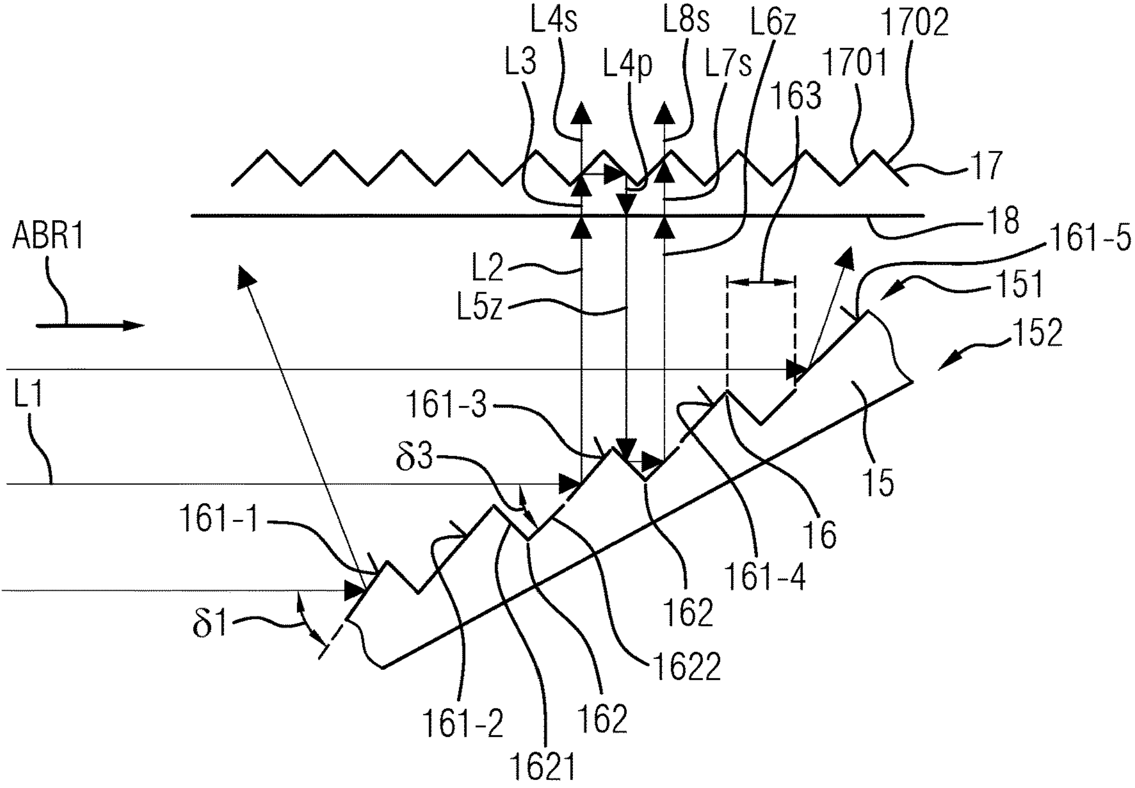
FIG. 11 shows a second embodiment with a curved folding mirror.

FIG. 11 schematically shows a part of a second embodiment with a curved folding mirror 15. Viewed macroscopically, the folding mirror 15 is once again not curved, but rather the microstructures 16 are arranged such that the folding mirror 15 acts like a cylindrical mirror. The upper interface 151 of the folding mirror 15 has microstructures 16, and its lower interface 152 does not have any particular optical or geometric properties that are essential in connection with the invention. The microstructures 16 have first mirror surfaces 161-*i*, of which the mirror surfaces 161-1 to 161-5 are shown. Each of the first mirror surfaces 161-*i* has a first angle $\delta i$ to the propagation direction ABR1 of the incident light, which differs from the other first angles $\delta i$. Between the first mirror surfaces 161-*i* are gaps 163, in which second surfaces 162 are arranged that are likewise designed in the form of reflecting surfaces. Instead of a respective single surface, two reflecting second surfaces 1621, 1622 which are arranged at a right angle to each other are provided as second surfaces 162. They therefore act as a retroreflector. A retarder 18 and a polarizer 17 are arranged above the folding mirror 15. In the present exemplary embodiment, the retarder 18 has the property of a quarter-wave plate, which is to say it converts linearly polarized input light into circularly polarized output light, and vice versa. The polarizer 17 is a reflective polarizer that allows linearly polarized light of a first polarization direction through and reflects light that is polarized perpendicularly thereto. Instead of a single surface, the polarizer has a multiplicity of polarizer surfaces 1701, 1702, which are arranged in pairs at a right angle with respect to one another. They therefore act as a retroreflector.

Unpolarized light L1 that is produced by the light source 12 and is collimated by the collimator 13 falls from the left onto the folding mirror 15 in the propagation direction ABR1. For the sake of clarity, only a few light rays are drawn here by way of example. This unpolarized light L1 is reflected by the mirror surfaces 161-3. It travels upwardly to the retarder 18 in the form of unpolarized light L2, passes through it, and leaves it in the form of unpolarized light L3. It is incident on the reflective polarizer 17, which is embodied in the form of a retroreflector and which lets pass (transmits) s-polarized light L4*s* and returns (reflects) p-polarized light L4*p*. The p-polarized light L4*p* passes through the retarder 18 and leaves it in the form of circularly polarized light L5*z*. The latter is incident on one of the reflecting second surfaces 162 which are likewise embodied in the form of retroreflector and is reflected thereby in the form of circularly polarized light L6*z* back to the retarder 18. It passes through the latter and leaves it in the form of s-polarized light L7*s*. The latter passes through the reflective polarizer 17 because it now has the polarization direction that the polarizer does not reflect but transmit. Consequently, further s-polarized light L8*s* travels in the direction of the display element 11.

According to a further embodiment which is not described to more detail, a transparent body 19 is provided as described in FIG. 6, which is provided with corresponding microstructures. The functions of the reflective polarizer 17 and of the retarder 18 are realized here in a circular polarizer 172, which is embodied as a retroreflector by means of first and second polarizer surfaces 1701 and 1702.

In other words, the disclosure relates to a head-up display with an imaging unit 1 with increased efficiency, which saves costs and installation space and has a folding mirror 15, in which, macroscopically, the angle of incidence and angle of reflection are not the same. Such a unit is also referred to as "blazed-mirror PGU" (PGU: picture generating unit). The disclosure relates to the field of head-up displays (HUD) and other display systems which utilize directed light having a specific polarization, for example based on liquid crystal display elements. The most current LED-based TFT-HUDs (TFT: thin film transistor—a variant of liquid crystal displays) have almost complete light output loss for one polarization component of the illumination light. Typically, this light output loss is realized in an external polarization filter to reduce the heating of the display element 11. There have appeared first systems on the market and in literature that re-use parts of the "incorrectly" polarized light. These systems with increased efficiency require additional components and consequently additional installation space and costs. The conventional systems require more energy, to which attention is increasingly paid (e.g. range, electro mobility). The thermal load is becoming increasingly critical for the systems/components in particular with increasing image sizes. The following is desired, individually or in combination: increase in efficiency, reduced installation space or enlargement of the virtual image while the installation space remains the same, reduction in costs, homogenization of the illumination. At least one of these is achieved according to the disclosure.

When using a folding mirror in which the angle of incidence and angle of reflection are not the same (blazed mirror), stripes from which no light emerges are produced from the view of the display element 11. These regions, the gaps 163, are used according to the disclosure in order to re-use light of the undesired polarization components by changing their polarization state and guiding it back to the display unit 11, thereby making it usable for backlighting the display element 11. This makes the HUD more cost-effective and it has a lower energy, installation space and/or cooling requirement and a more homogeneous illumination. More generally, the disclosure is also applicable to other efficiency-sensitive backlit display elements having a narrow viewing angle. The disclosure is also applicable to projection systems, for example based on DMD technology (DMD: digital micromirror device—like deflection of the device is based on one or more digitally controlled micromirrors), or on LCoS technology (LCoS: liquid crystal on silicon—light modulation is based on liquid crystals that are mounted on a silicon carrier). This is then a display unit having an imaging unit 1 for generating an image, wherein the imaging unit has a folding mirror, the folding mirror is arranged between a light source and a display element through which the light source radiates light, at a work angle to the propagation direction of the light that is incident on the folding mirror from the light source, the folding mirror has microstructures, wherein the microstructures have first mirror surfaces that are arranged at a first angle, which deviates from the work angle of the folding mirror, and are spaced apart from one another to form gaps, wherein second surfaces are arranged in the gaps at a second angle, a polarizer guides light having a first polarization to the display element and light having a second polarization into the gaps, a retarder converts the polarization of the light that is guided into the gaps into the first polarization, and the light that is guided into the gaps is guided in the direction of the display element after it has passed through the gaps. According to one embodiment, the light having the undesirable polarization is returned by a reflective circular polarizer 172 below the display to the folding mirror 15, where it is reflected into what was previously the dead zones, the gaps 163, is converted to the used direction by the circular polarizer 172, and is thereby re-used.

According to one embodiment, the angle at which the folding mirror is arranged and which is also referred to as blazed mirror is optimized to a tilt of the display element. A configuration consists in aligning the blazed mirror as parallel as possible to the display element. In this case, the structures thereof are blurred as uniformly as possible. In the case of image generating units with LED arrays which are currently being used, there are in part significant relative differences relating to the distance of the LEDs from a control element arranged under the display element, because the display element is tilted. This results in varying visibility of the LED array. This undesirable effect is greatly reduced by the approach of aligning the folding mirror and display element in parallel. The same distance of the display element from the folding mirror means smaller relative path differences.

According to variants of the disclosure, an astigmatism function, that is to say fanning out of the light reaching the display element 11, is achieved as follows. The angles δi of the surfaces 161-*i* reflecting the light incident from the left gradually change their values. So, a folding mirror 15 in the narrower sense no longer exists, but the folding mirror 15 thus formed is curved in one direction. Consequently, it is what is known as a blazed cylindrical mirror. The latter may of course be faceted, that is to say may be equipped with planar mirror surfaces 161-*i*, as is shown for example in FIG. 11. After reflection at the folding mirror 15, the light is no longer incident perpendicularly on the reflective polarizer 17. The reflected bundle of light would thus diverge. Therefore, provision is made in the embodiment of FIG. 11 for both reflective structures to be designed as a retroreflector, so that the recycled light also has the desired emission direction relative to the respective location.

The invention claimed is:

1. A head-up display for a transport, comprising:

an imaging unit for generating an image;

an optical unit for projecting the image by a mirror unit, wherein the imaging unit has a folding mirror, wherein the folding mirror is arranged between a light source and a display element, through which the light source radiates light, at a work angle to a propagation direction of the light that is incident on the folding mirror from the light source, wherein the folding mirror has microstructures, wherein the microstructures have first mirror surfaces that are each arranged at a first angle, which deviates from the work angle of the folding mirror, and are spaced apart from one another to form gaps, wherein second surfaces are arranged in the gaps each at a second angle;

a polarizer arranged upstream of and facing the display element on a first side and downstream of and facing the first mirror surface on a second side and configured to guide light having a first polarization to the display element and light having a second polarization into the gaps; and a retarder arranged upstream and directly facing the microstructures of the folding mirror and facing the second side of the polarizer and configured to convert polarization of the light guided into the gaps to the first polarization, and wherein the light guided into the gaps is guided in the direction of the display element after it has passed through the gaps.

2. The head-up display as claimed in claim 1, wherein the first mirror surfaces have first angles that differ from one another.

3. The head-up display as claimed in claim 2, wherein the folding mirror has two mutually parallel interfaces, of which the upper interface has first mirror surfaces and the lower interface has first mirror surfaces, wherein the first mirror surfaces of the lower interface have a second angle that differ from one another, and wherein the value of each second angle lies between the values of the first angles of two adjacent first mirror surfaces.

4. The head-up display as claimed in claim 3, wherein the reflective polarizer is inclined at an angle deviating from 90° to the propagation direction of the light coming from the folding mirror, which is incident thereon, and the reflecting second surfaces are arranged parallel to the reflective polarizer.

5. The head-up display as claimed in claim 1, wherein the first mirror surfaces are embodied in the form of a reflective polarizer, and the gaps are embodied in the form of retarders rotating the polarization direction by 90°.

6. The head-up display as claimed in claim 5, wherein the folding mirror has two mutually parallel interfaces, which both have the same microstructures arranged with a mutual offset.

7. The head-up display as claimed in claim 1, wherein the polarizer is designed as a reflective polarizer and is arranged between the folding mirror and the display element, and the retarder is designed as retarders that convert a linear polarization into circular polarization and is arranged between the folding mirror and the polarizer.

8. The head-up display as claimed in claim 7, wherein the reflecting second surfaces form a retroreflector in pairs in each case.

9. The head-up display as claimed in claim 8, wherein the first mirror surfaces have first angles that differ from one another, and the reflective polarizer has first polarizer surfaces and second polarizer surfaces, which form a retroreflector in pairs in each case.

10. The head-up display as claimed in claim 7, wherein the folding mirror is part of a transparent body with a wedge-shaped cross section, in which the wedge base area is the light entrance surface facing the light source, the microstructures are arranged on one of the large side faces, and the other large side face is the light exit surface facing the display element.

11. The head-up display as claimed in claim 1, wherein the folding mirror and the display element are aligned parallel to each other.

12. A head-up display for a transport, comprising:

an imaging unit for generating an image; and an optical unit for projecting the image by a mirror unit, wherein the imaging unit has a folding mirror, wherein the folding mirror is arranged between a light source and a display element, through which the light source radiates light, at a work angle to a propagation direction of the light that is unpolarized and incident on the folding mirror from the light source, wherein the folding mirror has microstructures facing the display element that have first mirror surfaces each arranged at a first angle that deviates from the work angle of the folding mirror, and wherein the folding mirror and the display element are aligned parallel to each other.

* * * * *